United States Patent [19]
Sykes

[11] Patent Number: 6,012,547
[45] Date of Patent: Jan. 11, 2000

[54] CARGO LOADER WITH QUICK-RELEASE LIFT-ASSISTED HANDRAIL

[75] Inventor: Stephen D. Sykes, Houston, Tex.

[73] Assignee: Stewart and Stevenson Services, Houston, Tex.

[21] Appl. No.: 09/302,241

[22] Filed: Apr. 29, 1999

Related U.S. Application Data

[60] Provisional application No. 60/083,610, Apr. 30, 1998.

[51] Int. Cl.[7] ...................................................... E06C 5/06
[52] U.S. Cl. ........................ 182/113; 248/281.11; 256/59
[58] Field of Search ....................... 182/113; 248/281.11; 256/59

[56] References Cited

U.S. PATENT DOCUMENTS

| | | |
|---|---|---|
| 2,043,312 | 6/1936 | Warner . |
| 2,674,500 | 4/1954 | Hukari . |
| 4,909,483 | 3/1990 | Van Herpen ............................. 182/113 |
| 4,936,407 | 6/1990 | Brock ...................................... 182/113 |
| 5,634,529 | 6/1997 | Nguyen ................................... 182/113 |

*Primary Examiner*—Alvin Chin-Shue
*Attorney, Agent, or Firm*—Browning Bushman

[57] ABSTRACT

A platform having a handrail along one side which includes a device that is quick-release, quick-engaging and lift-assisted, and is capable of supporting and retaining a full-sized handrail during normal operations. The present invention comprises a lockable, releasable mechanism that includes a biasing member for assisting in the raising and lowering of the handrail. The locking mechanism is preferably released by means of a foot pedal.

4 Claims, 4 Drawing Sheets

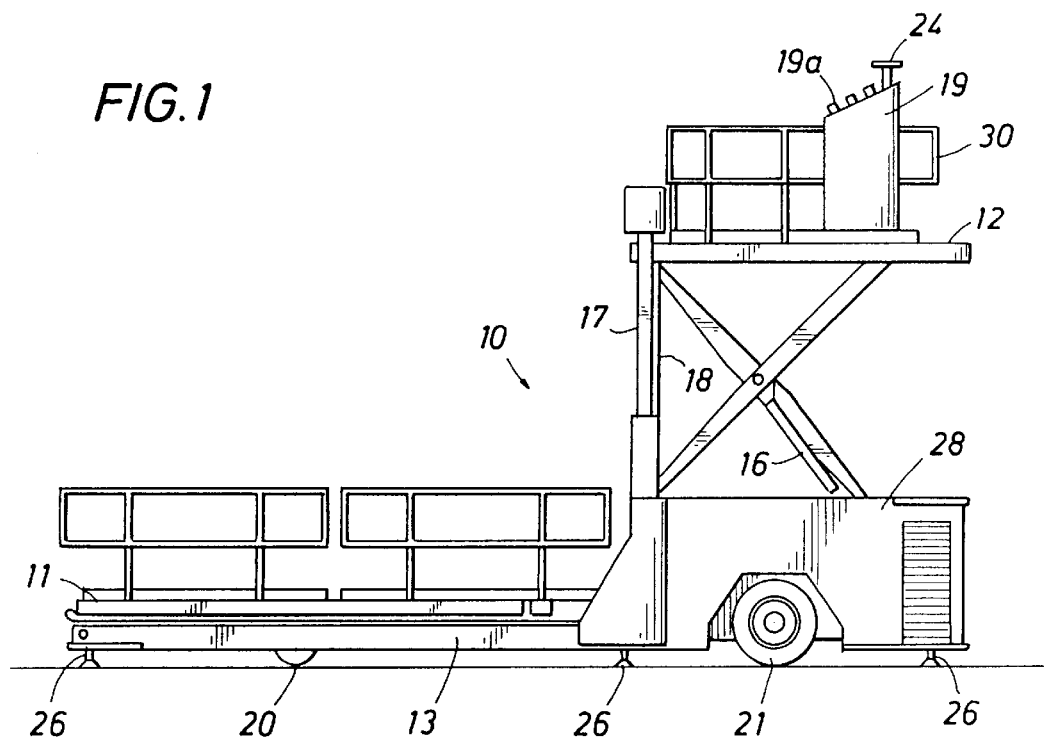
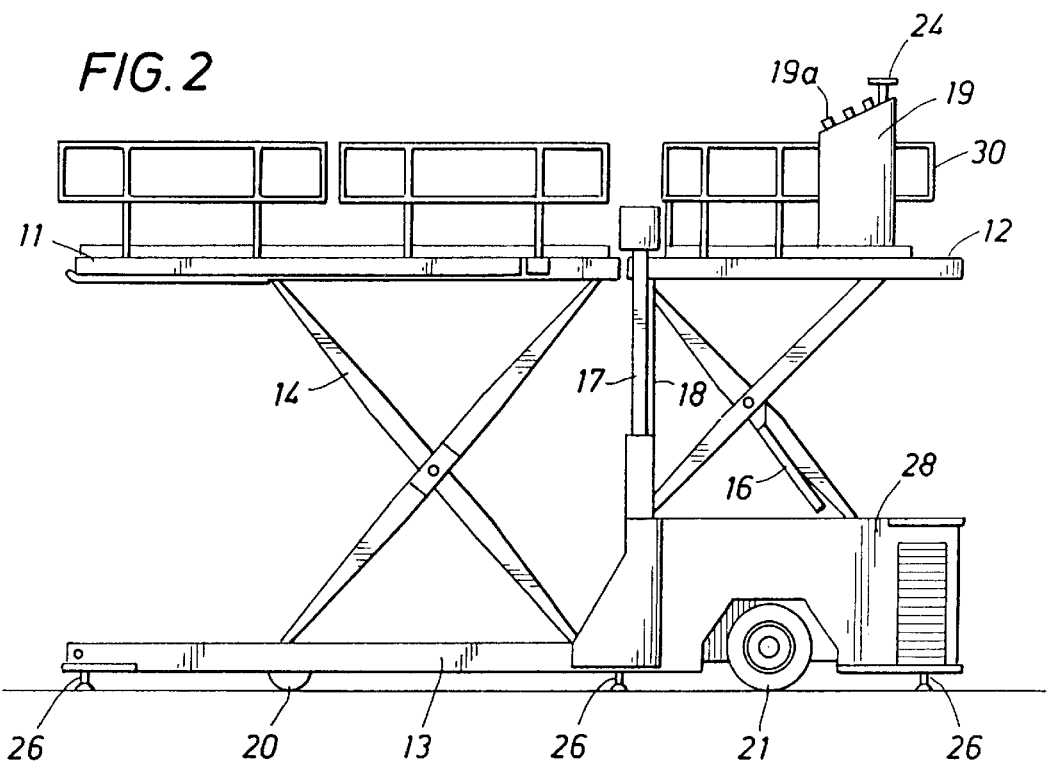

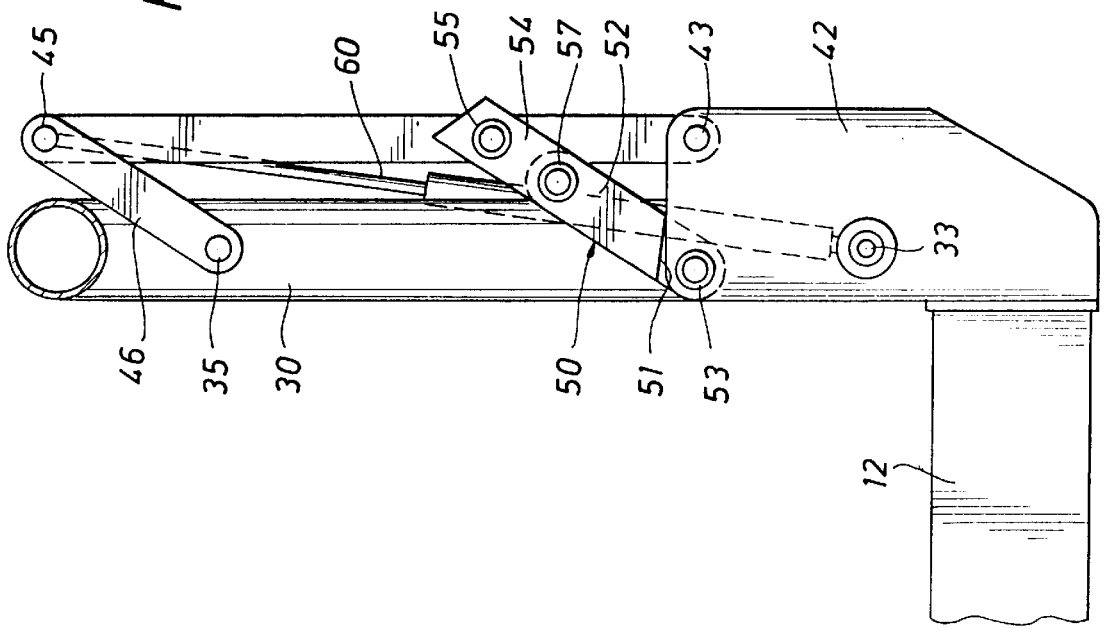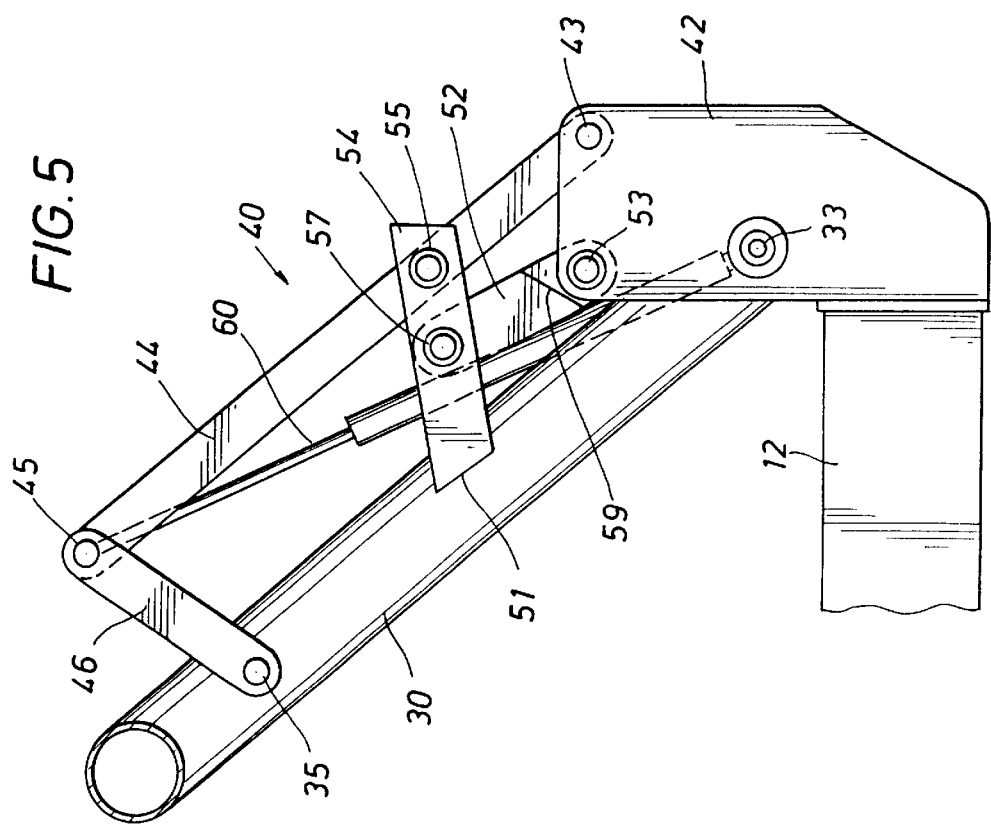

CARGO LOADER WITH QUICK-RELEASE LIFT-ASSISTED HANDRAIL

CROSS-REFERENCE TO RELATED APPLICATIONS

The present invention relates to inventions disclosed in provisional applications entitled Split Roller Wheel For Use With Aircraft Cargo Loaders, Ser. No. 60/083,667, Inventor: William C. Dean; Aircraft Cargo Loader With Multi-Center Platform Deck, Ser. No. 60/083,667, Inventor: William C. Dean; Aircraft Cargo Loader With Platform Leveling System, Ser. No. 60/083,666, Inventor: Stephen D. Sykes; all of which were filed Apr. 30, 1998, concurrently with the priority provisional application, entitled Aircraft Cargo Loader With Quick-Release Lift-Assisted Handrail, Ser. No. 60/083,610, Inventor: Stephen D. Sykes, and are incorporated herein in their entireties.

FIELD OF THE INVENTION

This invention relates generally to a platform having a handrail along at least one side thereof which may be moved between an upright and inclined positions with respect to the deck of the platform. In one of the aspects, it relates to an improved platform of this type which is especially well suited as a variable height platform of a loader which is used for loading and unloading cargo into and out of cargo holds of aircraft.

BACKGROUND OF THE INVENTION

Mobile loaders are essential equipment for the loading and unloading of containerized or palletized cargo into and from the holds of aircraft. Such loaders often employ two platforms. One platform, usually referred to as the bridge, provides an interface with the sill of the cargo door of the aircraft. The bridge is supported on a hydraulic lift, which provides a high degree of control and stability and allows the height of the bridge to be adjusted to correspond to the height of the aircraft cargo door. Once the bridge is positioned, it typically remains in a substantially constant position with respect to the aircraft, although it is known to make slight adjustments to the height of the bridge to compensate for shifts in the height of the aircraft cargo door as the plane is loaded or unloaded. Although the following discussion is presented in terms of a loading process, in which cargo is placed onto an aircraft, it will be understood all concepts apply equally to unloading processes.

The second platform, hereinafter referred to as the platform, onto which cargo may be loaded by means of a truck to one side, cycles up and down during the loading process to deliver cargo to the bridge. The platform is typically raised and lowered by means of hydraulic systems acting through appropriate mechanical linkages which ensure that the platform maintains a substantially horizontal attitude. For example, a pair of chains powered by hydraulic cylinders cooperate with a platform squaring or stabilizing scissors to ensure that the platform moves vertically during raising and lowering. Cargo loaders of this type are known in the art. As used herein, objects on which cargo is loaded includes both closed containers with relatively rigid bases and pallets having relatively flexible bases with loads of the cargo secured thereto.

The decks of the platform and bridge sections of cargo loaders are typically provided with some combinations of retractable guide rails that function to prevent movement of the cargo in an undesired direction. In addition, because the control panel for the loader is typically positioned on the bridge, since it is often necessary for the operator to walk about on the bridge, and because the bridge is typically several feet above the ground, the bridges of cargo loaders are usually supplied with a handrail which spans the port side of the bridge, as the forward edge of the bridge contacts the aircraft with its rear edge contacting the platform, and its starboard side being enclosed by the control cage or railing.

However, the configuration of aircraft and the maneuverability of the loaders makes it necessary to remove or lower the port handrail from time to time, so as to allow the loader to approach the aircraft and/or clear the aircraft or other equipment. In some prior loaders, the handrail is completely detachable from the bridge and therefore often becomes separated from the loader, gets lost and can no longer serve its intended purpose. In other prior loaders, the handrail is pivotally mounted on the bridge, and is secured in its upright position by a drop-in type of engagement with a receiving channel on the bridge frame. In either case, the operator is required to manually lift the entire weight of the handrail, both to engage and disengage it from the bridge. Aside from the hazards associated with heavy lifting, this is particularly dangerous, as secure footing on the bridge is hampered by the presence of friction reducing devices on the bridge deck.

Hence it is desired to provide a platform having such a handrail which is quickrelease, and quick-engaging and lift-assisted as it is moved between upright and inclined positions on the platform.

BRIEF SUMMARY OF THE INVENTION

The present invention comprises a lockable, releasable handrail that includes a biasing member for assisting in the raising and lowering of the handrail. The locking mechanism is preferably released by means of a foot pedal.

BRIEF DESCRIPTION OF THE DRAWINGS

For a more detailed description of the present invention, reference will now be made to the accompanying Figures, wherein:

FIG. 1 shows a typical cargo loader with its bridge raised and its platform lowered, FIG. 2 shows the cargo loader of FIG. 1 with its platform raised to the level of the bridge;

FIG. 4 is an enlarged side view of the handrail locked in an upright position;

FIG. 5 is an enlarged side view of the handrail in an intermediate, partially lowered position;

DETAILED DESCRIPTION OF THE PREFERRED EMBODIMENTS

Figure 3:
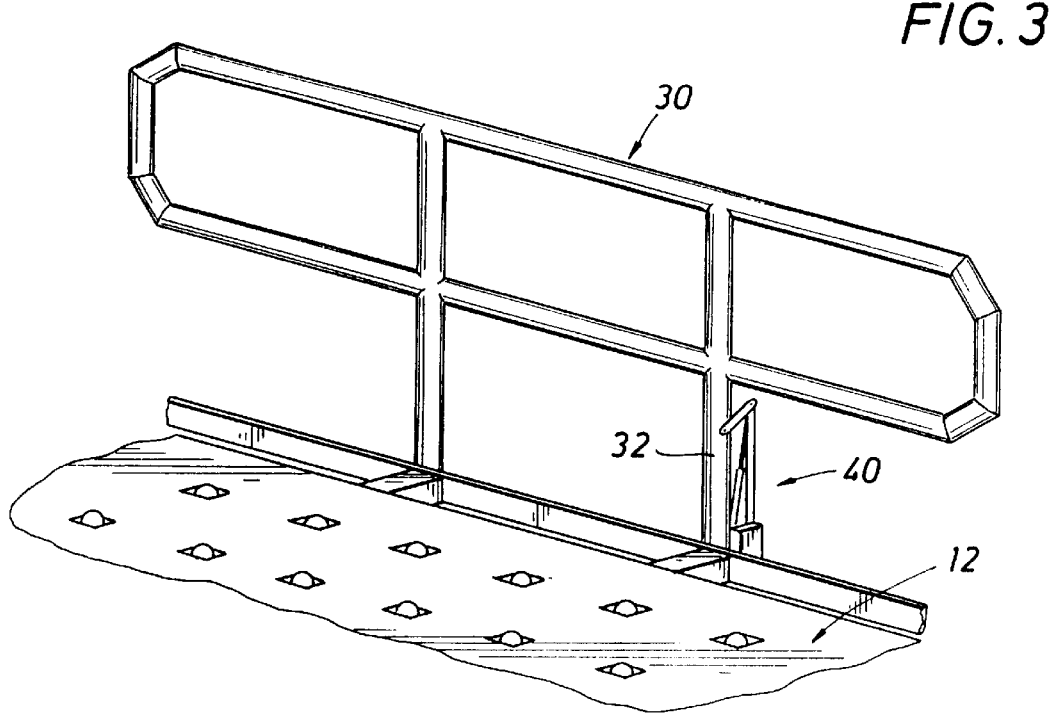
FIG. 3 is a partial perspective view of the port side of the bridge showing a handrail connected thereto and held in upright position in accordance with the present invention.

Referring initially to FIGS. 1 and 2, a typical cargo loader 10 includes a loading/unloading platform 11, bridge 12 and chassis 13 on which both are mounted. Platform 11 is supported and maintained in a level attitude with respect to chassis 13 by scissors 14. Bridge 12 has a platform which is similarly supported on a second scissors 15, and which is raised and lowered by a pair of hydraulic rams 16. Platform 11 is raised by means of a hydraulic lift 17 and leaf chains 18, with each chain being secured to platform 11 at one end and to chassis 13 at the other end.

Attached to the bridge 12 is a control station 19 that includes a control panel 19a. The chassis 13 is supported on four wheels, of which the rear pair 20 are free-wheeling and the front pair 21 are connected to steering and drive mechanisms (not shown). Control station 19 further includes a steering wheel 24 linked to the front wheels 21 for controlling and steering the loader. Mounted on the front of the chassis 13 is a housing 28 in which batteries (not shown), a motor/generator means (not shown) and associated transmission means (not shown) etc. are housed.

Along the port side of bridge 12 is a handrail 30 which typically spans the side of the bridge, and, to enable better maneuverability, as above mentioned, is lowerable onto the deck of the platform. Handrail includes at least one vertical leg 32, which supports horizontal members 34, and which is supported for movement between upright and inclined positions by a device as described in detail below.

Figure 6A:
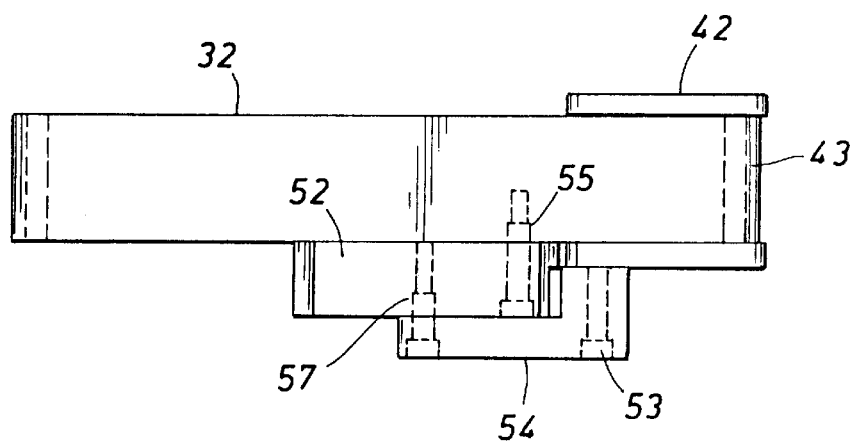
FIG. 6A is a top plan view of the handrail in the inclined position of FIG. 6.
Figure 6:
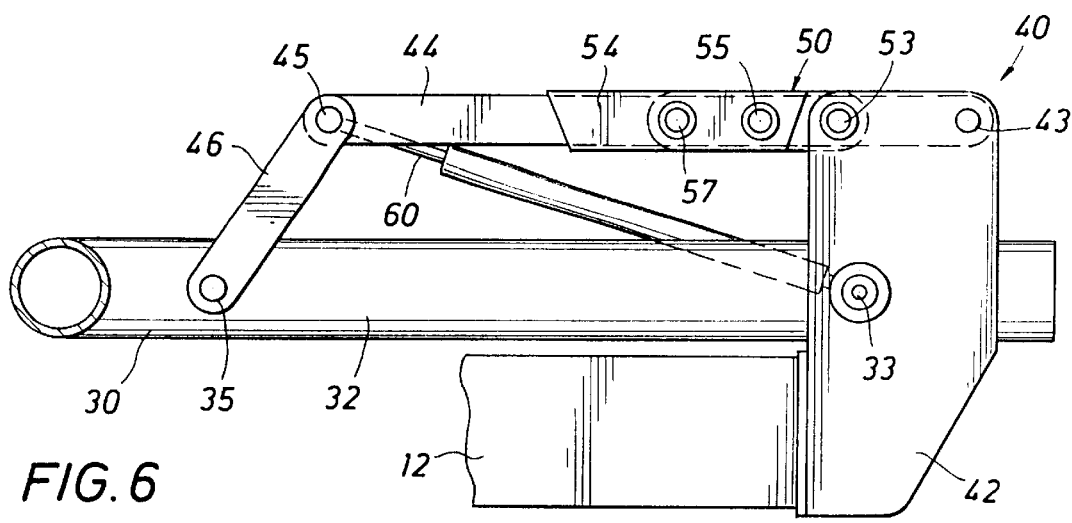
FIG. 6 is an enlarged side view of handrail in a fully inclined or lowered position over the platform.

Referring particularly now to FIGS. 4–6, locking device 40 comprises a base plate 42, secured to the port side of the bridge platform, a first arm 44, a second arm 46 and a lock mechanism 50. The lower end of leg 32 is pivotally attached to base plate 42 at pivot point 33. The lower end of arm 44 is pivotally attached to one corner of base plate 42 at pivot points 43, which is diagonally spaced apart from point 33. The upper end of arm 44 is pivotally attached to a first end of arm 46 at pivot point 45. The second end of arm 46 is pivotally attached to leg 32 at a pivot point 35. Pivot 35 is spaced apart from pivot point 33 a distance equal to the length of arm 44 between pivot points 43 and 45, and pivot points 33 and 43 are spaced a distance equal to the length of arm 46 between pivot point 35 and 45, thereby forcing a parallelogram linkage.

Lock mechanism 50 preferably comprises a first link 52 and a second link 54, best seen in FIG. 5. A first end of upper link 52 is pivotally attached to base plate 42 at pivot point 53, which together with pivot points 43 and 33 defines a substantially right triangle with its hypotenuse between points 43 and 33. A first end of link 54 is pivotally attached to arm 44 at a pivot point 55 between pivot points 43 and 45, and is pivotally attached near its midpoint to a second end of link 52 at a pivot point 57. As handrail 30 is raised from the lowered position of FIG. 6 to the upright position of FIG. 4, link 54 rotates counter-clockwise (as drawn) with respect to link 52.

In a preferred and illustrated embodiment, link 54 includes a canted end face 51 (FIG. 5), and link 52 includes a cutout (See FIG. 6A) that forms a canted face 59. Links 52, 54 are preferably configured such that when handrail 30 is in its upright position (FIG. 4), end face 51 bears on canted face 59, preventing further counter-clockwise rotation of upper link 54 relative to lower link 52 (as drawn). The parallelogram linkage moves between the closed position of FIG. 4 when the handrail is upright and the more open positions of FIGS. 5 and 6.

In a particularly preferred embodiment, faces 52, 54 are configured so that face 51 bears on face 59 when pivot points 53, 57, 55 have rotated slightly past alignment. Thus, in FIG. 4, pivot point 57 is incrementally below an imaginary line drawn between points 53 and 55. Once upper and lower links 52, 54 have rotated into this over-center position, and faces 51 and 59 are engaged, they are locked and movement of leg 32 in either direction is prevented.

Figure 7:
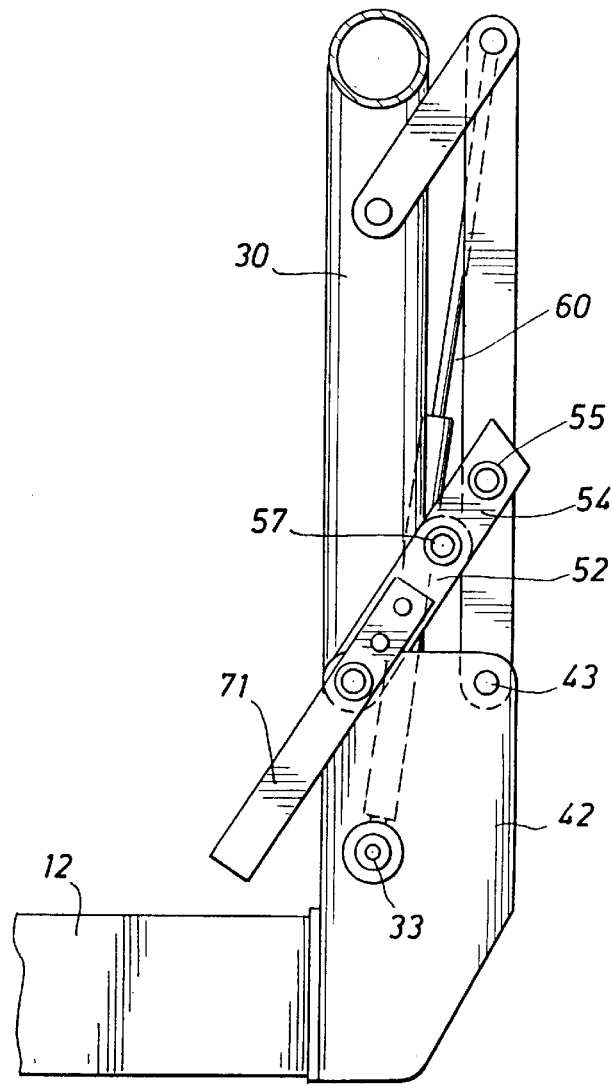
FIG. 7 is a side view of the handrail showing a foot pedal for unlocking it for to permit it to be moved from upright to inclined position.

In order to unlock lock mechanism 50, it is necessary to rotate lower link 52 counter-clockwise about pivot point 33 (as drawn). To this end, a foot pedal 71 (FIG. 7) is rigidly attached to lower lock link 52 beneath pivot 57 such that downward pressure on pedal 71 causes lower link 52 to rotate counter-clockwise about pivot point 33. This allows lock mechanism to proceed toward the position shown in FIG. 5.

Using locking device 40 as described above, handrail 30 can be latched in an upright position or unlatched and lowered to the deck surface. The components described above are passive, however, and neither impede nor facilitate movement of the handrail. To achieve the desired objective of facilitating movement of the handrail, therefore, the ends of a gas strut or spring 60 are attached at pivot point 45 and pivot point 33 between base plate 42 and the upper end of major arm 44. The gas spring includes a cylinder having compressed air on its piston side to exert a compressive force on the pivot point 45 of the parallelogram linkage. When held at a length that is less that its "natural" length, expansion member 60 applies a biasing force that tends to separate pivot points 33 and 45.

In operation, as handrail 30 is lowered, the distances between pivot points 33 and 43, 43 and 45, 45 and 35, and 35 and 33 remain fixed, with the result that the rhombus defined by those points changes shape as illustrated in FIGS. 5 and 6. More particularly, as handrail 30 is lowered, pivot points 33 and 45 approach each other and expansion member 60 applies an opposing force to movement in that direction. Conversely, as handrail 30 is raised, pivot points 33 and 45 move apart and the force applied by expansion member 60 tends to facilitate movement in that direction. It is of course preferred that the moment about pivot point 33 resulting from the compressive force applied by spring 60 be just slightly less than the opposite moment resulting from weight of the handrail, so that the handrail will remain inclined until lifted. On the other hand, the spring expands as the handrail is moved with a decreasing compressive force.

While preferred embodiments of this invention have been shown and described, modifications thereof can be made by one skilled in the art without the departing from the spirit or teaching of this invention. The embodiments described herein are exemplary only and are not limiting. Many variations and modifications of the system and apparatus are possible and are within the scope of the invention. Accordingly, the scope of the protection is not limited to the embodiments described herein, but is only limited by the claims which follow, the scope of which shall include all equivalents of the subject matter of the claims.

I claim:

1. A platform, having
   a deck,
   a handrail, and
   means pivotally mounting the handrail to the deck for movement in opposite rotational directions between upright and inclined positions with respect to the deck, said mounting means including
   a first arm pivotally connected at one end to the deck,
   a second arm pivotally connected at one end to the handrail,
   the opposite ends of the arms being pivotally connected to one another to form a parallelogram linkage which maintains the handrail and first arm parallel as the handrail moves between upright and inclined positions, a first link pivotally connected at one end of the deck, a second link pivotally connected at one end to the first arm, the opposite end of the first link being pivotally connected to an intermediate portion of the second link so that the second link is swung to a first position in which a face thereon engages a face on the first link to limit further rotational movement in a first rotational direction as the handrail is moved its upright position, and means applying a yieldable force to urge the pivotal connection of the arms to one another as the handrail is swung between its upright and inclined positions.

2. As in claim 1, wherein the force applying means comprises a gas spring pivotally connected at opposite ends to the handrail and the pivotal connection at the arms to one another.

3. As in claim 1, wherein the pivotal connection of the first link to the second link moves into an over center position as its face engages said face on the second link.

4. As in claim 3, including a foot operated pedal connected to the second link for moving the links out of over center position so as to release the handrail for movement to its inclined position.

* * * * *